United States Patent

Molitor et al.

[11] Patent Number: 5,150,906
[45] Date of Patent: Sep. 29, 1992

[54] MULTI-PIECE GOLF BALLS AND METHODS OF MANUFACTURE

[75] Inventors: Robert P. Molitor, Niles, Mich.; Terence Melvin, Somers, Conn.

[73] Assignee: Lisco, Inc., Tampa, Fla.

[21] Appl. No.: 321,689

[22] Filed: Mar. 10, 1989

[51] Int. Cl.⁵ .................. A63B 37/08; B23P 25/00
[52] U.S. Cl. .................. 273/220; 273/235 R; 273/231; 273/DIG. 22; 273/58 H; 29/530; 29/899; 264/4; 264/248; 264/310; 156/97; 156/145
[58] Field of Search .................. 273/DIG. 8, 231, 218, 273/220, 235 R, 58 H, 62; 29/530, 899, 899.1; 156/145, 445, 97; 264/4, 248, 310

[56] References Cited

U.S. PATENT DOCUMENTS

| | | | |
|---|---|---|---|
| 567,459 | 9/1896 | Elwell | 273/58 B |
| 593,264 | 11/1897 | Wolcott | 273/58 B |
| 710,750 | 10/1902 | Cavanagh | 273/229 |
| 712,412 | 10/1902 | Richards | 273/58 BA |
| 725,011 | 4/1903 | Richards | 273/58 B |
| 985,741 | 2/1911 | Harvey | 273/230 |
| 1,146,523 | 7/1915 | Roberts | 273/58 B |
| 1,151,396 | 8/1915 | Roberts | 273/58 B |
| 1,163,987 | 12/1915 | Eggers | 273/58 B |
| 1,167,396 | 1/1916 | Gammeter | 273/62 |
| 1,202,318 | 10/1916 | Roberts | 273/230 |
| 1,209,644 | 12/1916 | Price | 273/58 B |
| 1,320,221 | 10/1919 | Fukuda | 273/58 BA |
| 1,339,992 | 5/1920 | Wais | 273/59 R |
| 1,400,146 | 12/1921 | Eggers | 156/196 |
| 1,402,682 | 1/1922 | Takashima | 156/145 |
| 1,409,059 | 3/1922 | Miller | 156/78 |
| 1,542,005 | 6/1925 | Riley | 40/327 |
| 1,580,230 | 4/1926 | Brereton | 273/199 R |
| 1,636,518 | 7/1927 | Lannom | 273/60 R |
| 1,942,993 | 1/1934 | Aultman | 156/147 |
| 2,211,028 | 8/1940 | Roberts | 156/147 |
| 2,249,612 | 7/1941 | Kalowski | 264/4 |
| 2,483,234 | 9/1949 | Roberts | 156/147 |
| 2,532,839 | 12/1950 | Fawick | 156/228 |
| 2,956,611 | 10/1960 | Jendrisak | 156/73.5 |
| 2,998,977 | 9/1961 | Molitor | 273/225 |
| 3,070,479 | 12/1962 | Meyer | 156/196 |
| 3,099,452 | 7/1963 | Fernirola | 273/58 H |
| 3,102,362 | 9/1963 | Neal | 446/129 |
| 3,132,417 | 5/1964 | Irwin | 29/433 |
| 3,248,113 | 4/1966 | Baggenstess et al. | 273/DIG. 8 |
| 3,299,193 | 1/1967 | Vergara | 264/163 |
| 3,534,965 | 10/1967 | Harris | 273/218 |
| 3,643,843 | 8/1969 | Taylor | 264/68 |
| 3,652,088 | 3/1972 | Marsh | 273/26 E |
| 3,767,740 | 10/1973 | Jones-Hinton | 264/27 |
| 3,819,768 | 6/1974 | Molitor | 273/235 R |
| 3,908,993 | 9/1975 | Gentiluomo | 273/60 R |
| 3,933,967 | 1/1976 | Taylor | 264/248 |
| 3,940,145 | 2/1976 | Gentiluomo | 273/218 |
| 3,940,146 | 2/1976 | Little | 273/218 |
| 3,976,295 | 8/1976 | Heald, Jr. | 273/60 R |
| 3,989,568 | 11/1976 | Isaac | 273/235 R |
| 4,003,574 | 1/1977 | MacDonald | 273/65 EC |
| 4,129,720 | 4/1977 | Heald, Jr. | 273/60 R |
| 4,130,619 | 12/1978 | Held | 264/162 |
| 4,144,297 | 3/1979 | Tomar | 264/45.5 |
| 4,154,789 | 5/1979 | Delacoste | 264/138 |
| 4,208,053 | 6/1980 | Farr | 273/58 H X |
| 4,211,407 | 7/1989 | Tomar | 273/60 B |
| 4,212,460 | 7/1980 | Kraft | 273/58 H X |
| 4,224,276 | 9/1980 | Gallizia | 264/571 |
| 4,229,401 | 10/1989 | Pocklington | 264/248 |
| 4,248,424 | 2/1981 | Judkins | 273/60 B |
| 4,248,826 | 2/1981 | Weber | 264/328.14 |

(List continued on next page.)

[57] ABSTRACT

An improved golf ball having a coefficient of restitution of at least 0.700 and comprising a hollow, spherical shell of a deformable polymeric material which is filled with either a liquid or a unitary, non-cellular core of a material which, at the time of introduction into the shell, is a liquid. The spherical shell may be solid or cellular. The core material may be added through a hole in the shell as a liquid, a gel or a melt. In the preferred embodiment, the spherical shell is formed from two half shells which are bonded to each other. The mating edges of the half shells may have surface configurations which maximize their contact area.

5 Claims, 6 Drawing Sheets

U.S. PATENT DOCUMENTS

| | | | |
|---|---|---|---|
| 4,258,917 | 3/1981 | Murphy | 273/65 ED |
| 4,272,079 | 6/1981 | Nakade | 273/225 |
| 4,274,637 | 6/1981 | Molitor | 273/DIG. 8 |
| 4,367,873 | 1/1983 | Chang | 273/60 R |
| 4,501,715 | 2/1985 | Barfield | 264/248 |
| 4,568,083 | 2/1986 | Miller | 273/60 B |
| 4,610,071 | 9/1986 | Miller | 273/DIG. 8 |
| 4,653,752 | 3/1987 | Miller | 273/60 B |
| 4,805,914 | 2/1989 | Toland | 273/231 |
| 4,872,676 | 10/1989 | Townsend | 273/58 H |

FOREIGN PATENT DOCUMENTS

| | | | |
|---|---|---|---|
| 137687 | 5/1948 | Australia | 273/231 |
| 253976 | 11/1948 | Fed. Rep. of Germany | 273/58 B |
| 976260 | 10/1950 | France | 273/58 B |
| 1096722 | 12/1953 | France | 273/61 A |
| 1297291 | 5/1961 | France | 273/58 B |
| 2504019 | 4/1981 | France | 273/58 H |
| 548449 | 9/1956 | Italy | 273/58 B |
| 11244 | of 1905 | United Kingdom | 273/62 |
| 6566 | of 1907 | United Kingdom | 273/62 |
| 244847 | 12/1925 | United Kingdom | 273/58 A |
| 400908 | 2/1932 | United Kingdom | 273/58 B |
| 738119 | 10/1955 | United Kingdom | 273/58 BA |
| 881316 | 11/1961 | United Kingdom | 273/58 BA |
| 1209316 | 6/1967 | United Kingdom | 273/231 |
| 1521121 | 8/1978 | United Kingdom | 273/58 B |

OTHER PUBLICATIONS

Three Photographs.
1935 Spalding Catalog pp. 32,33 relating to "Kro-Flite" golf balls.
1937 Spalding Catalog, p. 6 "Spalding Golf Balls have a Geer Patent Cover".
1940 Spalding Cataog, p. 5, "A 'True Solution' for a Better Game".

*Primary Examiner*—George J. Marlo

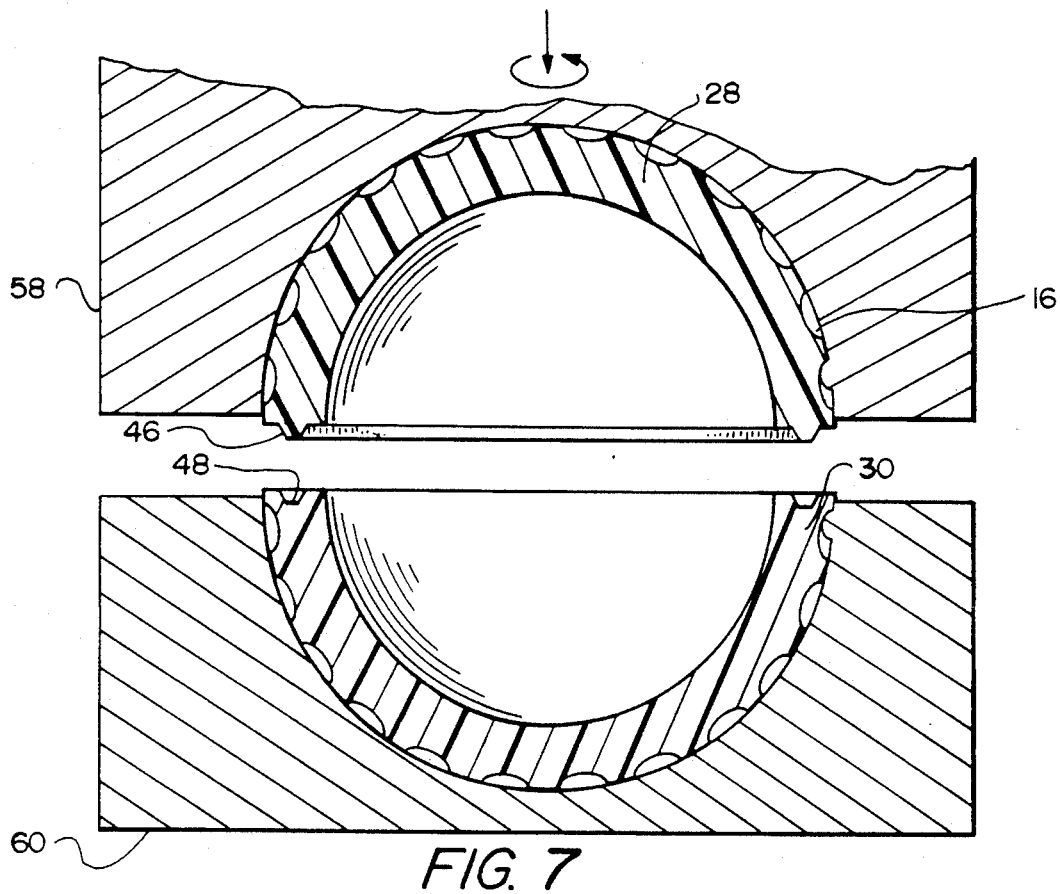
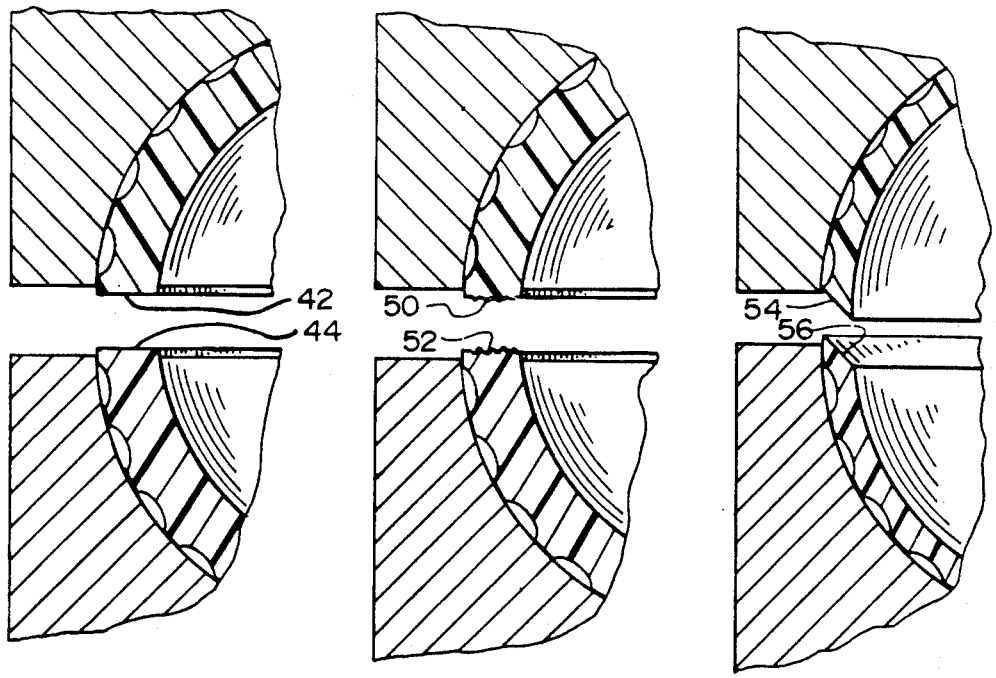
FIG. 8  FIG. 9  FIG. 10

MULTI-PIECE GOLF BALLS AND METHODS OF MANUFACTURE

TECHNICAL FIELD

This invention relates to multi-piece golf balls and their method of manufacture and, more particularly, to golf balls comprising a hollow, spherical shell of a polymeric material and a unitary, non-cellular core of a material which, at the time of introduction into the shell, is a liquid.

BACKGROUND OF THE INVENTION

Golf balls are of two types, solid balls and multi-piece balls. Solid balls consist of a polymeric sphere into which is molded a plurality of dimples to aid the flight characteristic. Multi-piece balls consist of either a wound or solid core which is covered with a separate and distinct cover. The present invention is concerned with the latter-mentioned multi-piece-type golf balls and their methods of manufacture at a reduced cost while maintaining or enhancing their performance.

Over sixty years ago, balata, a natural resin, came into widespread usage as a golf ball cover composition. Balata is a natural resin. When balata is used as a golf ball cover it becomes necessary to incorporate into the golf ball a complex core. Often the core of the golf ball has been its most complex component In accordance with the present invention, known golf ball cores are replaced with simplified, unitary cores of inexpensive materials which, in their fluid state, are injected into a hollow shell. This invention thus relates to a new golf ball comprising a hollow polymeric shell into which is injected the core material.

During the last twenty year, synthetic polymeric materials and mixtures thereof have come into widespread use as golf ball covers. In order to maintain the performance of golf balls, whether with covers of natural or synthetic materials, it has been necessary to utilize expensive, preformed core systems with the cover material molded therearound which complicates the manufacturing process and thus raise the cost of manufacturing.

With the present invention, it is possible to eliminate the complicated, costly core system and yet produce golf balls with surprisingly good Coefficient of Restitution which can be manufactured for reduced costs. Further, it is possible to adjust the radius of gyration of the balls of this invention. These benefits are attained while still allowing for the utilization of optical brighteners in the polymeric shells. This invention is thus concerned with golf balls including their shell compositions as well as their core compositions.

The literature discloses various game balls and their methods of manufacture. Note in particular United Kingdom Patent Number 6566 to Hodgson and U.S. Pat. No. 4,653,752 to Miller. Hodgson discloses a golf ball with an internal core having an india rubber bladder which is filled with a pressurized gas, and this whole structure is encased in a thick external shell of gutta percha. Resilience is allegedly attained from the compressible inner core acting upon the resilient shell. The golf ball of the present invention derives all or a substantial portion of its resilience from its shell. According to the Miller patent, a softball or baseball is fabricated of a plastic shell formed from hemispheres with an injected cellular core. The resulting product is a softball wherein the resilience characteristics are completely different than that of the golf ball of the present invention. Lastly, U.S. Pat. No. 4,798,386 to Berard discloses a golf ball which employs a preformed core to which is subsequently applied a thick shell.

For approximately the last 40–50 years golf balls have been made by bonding a cover about a core. The cover can be applied to the preformed core by compression molding of two half shells, or a core can be positioned in an injection mold and the cover directly molded onto the prepositioned core.

For at least 50 years, golf balls have been formed using various liquid components. In the most common manner, a pre-formed bladder was formed and filled with a suitable liquid. These preformed bladders in the past were filled with liquids such as water, mineral oil, honey, aqueous solutions of organic and inorganic materials. Likewise, the applicant believes that liquids were further injected into the above-described partially filled bladders subsequent to the complete formation of the balls. Further, the Applicant believes that liquids were injected into the spaces between the various strands of rubber-wound cores subsequent to the formation of a finished ball.

Additional patents of interest are listed in applicant's statement of the background art.

From the above descriptions, it is obvious golf balls have been manufactured with centers comprising both rubber and liquid components such as a liquid in a bladder center and liquid in the rubber winding centers. However, no golf ball has been manufactured with a shell whose center was solely initially filled with a liquid.

No prior disclosure or golf ball or method of manufacture teaches or suggests the present inventive combination of a golf ball comprising a hollow, spherical shell of a polymeric material and a unitary, non-cellular core of a material which is, at the time of introduction into the shell, a liquid, wherein such a golf ball can be made more efficiently and economically from known materials with conventional manufacturing processes.

Therefore, it is an object of the present invention to provide golf balls and methods of manufacturing which overcome the inadequacies of the prior art and which represent a significant contribution to the golf ball art.

Another object of this invention is to reduce the cost of multi-piece golf balls by injecting a non-cellular liquid core material into a preformed shell.

It is yet a further object of the invention to improve golf ball shell/core constructions for cost reduction.

Lastly, it is an object of the present invention to maintain or improve the performance of golf balls by a design which allows for a reduction in the cost of materials and simplification of manufacturing steps by utilizing a preformed shell, rather than a preformed core, as the starting point for fabrication.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

The invention is defined by the appended claims with the specific embodiments shown in the attached drawings. For the purpose of summarizing the invention, the invention may be incorporated into an improved golf ball having a unitary core and a shell, the shell being formed as a hollow, spherical shell of polymeric material and a non-cellular core injected into the shell, the core being formed of a material which, at the time of introduction into the shell, is a liquid.

The invention may also comprise an improved method of fabricating a golf ball having the steps of: (1) molding a pair of hollow, generally hemispherically shaped halves from a polymer; (2) coupling together the halves to form a hollow, spherical shell; (3) introducing a liquid through a hole in the shell to form a non-cellular core and (4) sealing the hole.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiments may be readily utilized as a basis for modifying or designing other methods and constructions for carrying out the same purposes of the present invention. It should also be realized by those skilled in the art that such equivalent methods and constructions do not depart from the spirit and scope of the invention as set forth in the appended claims.

DESCRIPTION OF THE DRAWINGS

For a fuller understanding of the nature and objects of the invention, reference should be had to the following detailed description taken in conjunction with the accompanying drawings in which:

FIG. 7 is a sectional view of two hemispherical shell halves loaded in opposed fixtures of a spin welding machine prior to being coupled for forming a shell.

FIGS. 8, 9, and 10 are fragmentary views of alternate embodiments of the area of joining the shell halves and also showing parts of the fixtures.

Similar referenced characters refer to similar parts throughout the several Figures.

DESCRIPTION OF THE PREFERRED EMBODIMENTS

An Overview

Figure 1:
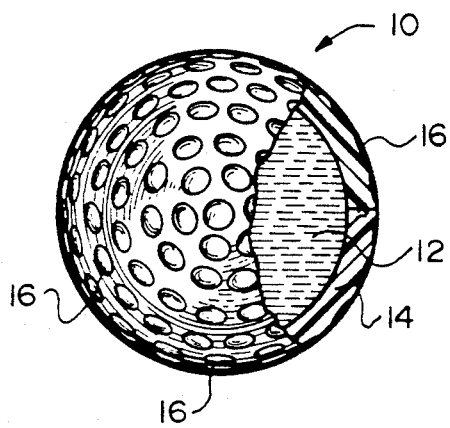
FIG. 1 is an elevational view, partly in section, showing a golf ball constructed in accordance with the principles of a primary embodiment of the present invention.

FIG. 1 illustrates a golf ball 10 constructed in accordance with the principles of the present invention. FIG. 1 is partly in section with parts broken away to show certain internal constructions. The golf ball of the present invention maintains or improves the performance of presently known and utilized golf balls. It is constructed of two major components, an internal portion or core 12 and an external portion or shell 14. The core is of a spherical configuration while the shell is formed of a hollow spherical configuration with the exterior surface of the core in contact with the interior surface of the shell. The exterior surface of the shell is formed with dimples 16 to provide improved flight characteristics and to create an appearance essentially identical with commercially available golf balls. The selection of the proper dimple pattern is within the purview of one skilled in the golf ball art.

Describing the components of the subject golf ball, the term spherical is used in conjunction with both the core and the shell. It is understood by one skilled in the art that when referring to golf balls and their components, the term spherial includes surfaces which may have minor deviations from the perfect ideal geometric shapes, as for example, dimples on the exterior surface of the ball to effect its aerodynamic properties. Further the internal surface of the shell as well as the core may likewise incorporate intentionally designed patterns.

Figure 2:
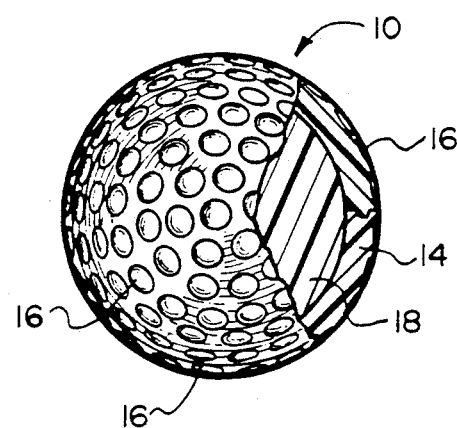
FIG. 2 is an elevational view similar to that of FIG. 1 but illustrating an alternate core construction.
Figure 3:
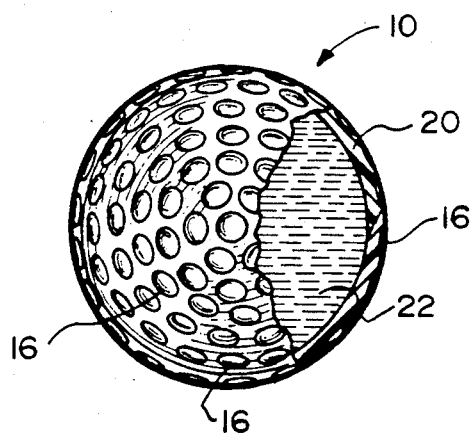
FIG. 3 is an elevational view similar to FIG. 1 but showing an alternate, thin wall, shell construction.
Figure 4:
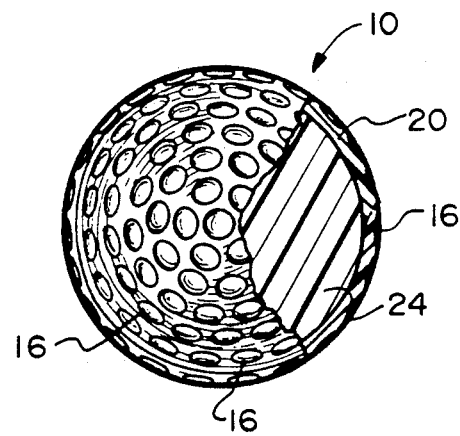
FIG. 4 is an elevational view similar to that of FIG. 3 but illustrating an alternate core construction.

In the FIG. 2 embodiment, the core 18 is of a solid material rather than the liquid material of FIG. 1. FIGS. 3 and 4 illustrate an alternate embodiment of the invention with a thin wall shell 20 with a liquid core 22 in the FIG. 3 embodiment and with a solid core 24 in the FIG. 4 embodiment.

The Shell

Thermoplastic materials are generally preferred for use as shell materials in accordance with this invention. Typical, but not limitive of the properties desirable for the resin, are good flowability, moderate stiffness, high abrasion resistance, high tear strength, high resilience, and good mold release, among others. Preferred polymeric materials for use in accordance with this invention are ionic copolymers of ethylene and an unsaturated monocarboxylic acid which are available under the trademark "SURLYN" of E.I. DuPont De Nemours & Company of Wilmington, Del. which are copolymers of ethylene and methacrylic acid partially neutralized with zinc, or sodium or lithium and under the trademark ESCOR by Exxon Chemical Company, Houston, Tex., which are copolymers of ethylene and acrylic acid partially neutralized with zinc or sodium.

In accordance with the various embodiments of the present invention, the shells are of a thickness from about 0.060 inches to about 0.410 inches. Standard golf ball covers in use today are generally about 0.090 inches in thickness.

In accordance with a preferred embodiment of this invention, the shell in question is formed from mixtures or blends of zinc and sodium ionic copolymers sold by E.I. DuPont De Nemours Company, Inc., under the trademarks "SURLYN". A more preferred embodiment comprises mixtures or blends of Surlyn and "SURLYN" 1706/9910 and 1605/8940.

Singular ionic copolymers can be used as shell materials in the subject invention. These singular materials are described in U.S. Pat. No. 3,454,280 issued Jul. 8, 1969. The use of mixed Surlyn resins in accordance with the above described preferred embodiment is described in U.S. Pat. No. 3,819,789 issued Jun. 25, 1974. Ionic copolymers of the type suitable for use in this invention are further described in detail in U.S. Pat. No. 3,264,272 issued Aug. 2, 1966 and U.S. Pat. No. 4,679,795 issued Jul. 14, 1987.

Surlyn resins are ionic copolymers which sodium or zinc salts of the reaction product of an olefin having from 2 to 8 carbon atoms and an unsaturated monocarboxylic acid having from 3 to 8 carbon atoms. The carboxylic acid groups of the copolymer may be totally or partially neutralized.

This invention can likewise be used in conjunction with cellular polymeric golf ball shells as are described in U.S. Pat. No. 4,274,637 issued Jun. 23, 1981.

Synthetic polymeric materials, other than those described above, which can be used in accordance with this invention as shell materials include homopolymeric and copolymer materials which may be adapted for use in this invention are as follows:

(1) Vinyl resins formed by the polymerization of vinyl chloride, or by the copolymerization of vinyl chloride with vinyl acetate, acrylic esters or vinylidene chloride;

(2) Polyolefins such as polyethylene, polypropylene, polybutylene and copolymers such as polyethylene methylacrylate, polyethylene ethylacrylate, polyethylene vinyl acetate, polyethylene methacrylic or polyethylene acrylic acid or polypropylene acrylic acid or terpolymers made from these and acrylate esters and their metal ionomers, polypropylene/EPDM grafted with acrylic acid as sold under the trademark "Polybond" by Reichhold Chemicals, Inc., Hackettstown, N.J. 07840, or anhydride modified polyolefins as sold under the trademark "Plexar" by Northern Petrochemical Company, Rolling Meadows, Ill. 60008.

(3) Polyurethanes, such as are prepared from polyols and diisocyanates or polyisocyanates;

(4) Polyamides such as poly (hexamethylene adipamide) and others prepared from diamines and dibasic acids, as well as those from amino acids such as poly (caprolactam), and blends of polyamides with Surlyn, polyethylene, ethylene copolymers, EDPM, etc.

(5) Acrylic resins and blends of these resins with poly vinyl chloride, elastomers, etc.

(6) Thermoplastic rubbers such as the urethanes, olefinic thermoplastic rubbers such as blends of polyolefins with EPDM, block copolymers of styrene and butadiene, or isoprene or ethylene-butylene rubber, polyether block amides, an example of such a product is sold under the trademark "Pebax" by Rilsan Industrial, Inc., Birdsboro, Pa. 19508;

(7) Polyphenylene oxide resins, or blends of polyphenylene oxide with high impact polystyrene as sold under the trademark "Noryl" by General Electric company, Pittsfield, Mass.

(8) Thermoplastic polyesters, such as PET, PBT, PETG and elastomers sold under the trademarks "Hytrel" by E.I. DuPont De Nemours & Company of Wilmington, Del. and "Lomod" by General Electric company of Pittsfield, Mass.

(9) Blends and alloys including polycarbonate with ABS, PBT, PET, SMA, PE, elastomers, etc. and PVC with ABS or EVA or other elastomers.

Blends of thermoplastic rubbers with polyethylene, propylene, polyacetal, nylon, polyesters, cellulose esters, etc.

In the above description shorthand symbols are used to describe certain polymers. The symbols used and their description are as follows:
ABS Acrylonitrile butadiene styrene
PBT Polybutylene terephthalate
PET Polyethylene terephthalate
SMA Styrene maleic anhydride
PE Polyethylene
PETG Polyethylene terephthalate/glycol modified
EPDM Ethyl-propylene-non-conjugated diene terpolymer
PVC Polyvinyl chloride
EVA Ethylene vinyl acetate The above list is not meant to be limiting or exhaustive, but merely illustrates the wide range of polymeric materials which may be used to form the shell in the present invention. Mixtures of the above-described materials may also be used. Further the polymers used to form the outer shell, in accordance with the present invention, may be stress oriented subsequent to the formation of the shell. Likewise, in accordance with the present invention, reinforced polymeric materials may be utilized in the shell.

It is within the purview of this invention to add to the shell compositions of this invention materials which do not affect the basic novel characteristics of the composition of this invention. Among such materials are antioxidants, antistatic agents, and stabilizers.

As can be seen from the discussion above, the subject invention can be used in conjunction with a wide variety of polymeric materials which are suitable for the formation of shells.

The white basic color of the golf ball shell is formed by the pigmentation of one of the above-mentioned polymeric materials. Suitable pigments for use in accordance with this invention include the following: titanium dioxide, zinc oxide, zinc sulfide and barium sulfate.

The amount of pigment used in conjunction with the polymeric shell composition naturally depends on the particular polymeric material utilized and the particular pigment utilized. The concentration of the pigment in the polymeric shell composition can be from about 1 percent to about 25 percent as based on the weight of the polymeric material. A more preferred range is from about 1 percent to about 5 percent as based on the weight of the polymeric material. The most preferred range is from about 1 percent to about 3 percent as based on the weight of the polymeric material. The percent pigment utilized is in large part determined by the weight needed to provide a golf ball with the preferred physical characteristic. It is understood by one skilled in the art that the percent of pigment added must be balanced with the weight of the core material in order to attain the desired density of the resulting golf ball.

Preferred shell compositions for use in accordance with this invention are the ionomers described above including Surlyn and ESCOR resins and they may be used in conjunction with fillers, pigments and other additives. The most preferred pigment for use in accordance with this invention, if one is to be used, is titanium dioxide. When this combination of components is utilized, it is preferred that the concentration of titanium dioxide in the shell composition be from about 1 percent to about 10 percent as based on the weight of Surlyn resin utilized. A more preferred range for the concentration of titanium dioxide is from about 1 percent to about 5 percent as based on the Surlyn resin utilized. A most preferred concentration for the titanium dioxide is about 2 percent as based on the weight of the Surlyn resin utilized.

As has been amply discussed above, the subject invention can utilize a wide variety of polymers. When pigmented, many of the polymers in question and in particular Surlyn resins, are not glossy after injection molding. Experience has demonstrated that the average golfer prefers a glossy golf ball. In order to produce glossy golf balls, the balls of this invention may be coated with a clear epoxy-urethane coating system subsequent to molding. The system in question consists of a clear epoxy primer and/or water borne primer, followed by a clear urethane coat. Use of this clear coat system is not mandatory in order to achieve the desirable results of this invention; however, it is highly desirable. In addition to high initial gloss, the above-mentioned system produces a golf ball which is durable and maintains its gloss during play. It is understood by one skilled in the art that other clear coat systems can likewise be utilized.

Further, it is understood by one skilled in the art that the golf balls of the invention can be painted with a pigmented paint in a conventional manner.

The radius of gyration of a golf ball is an important attribute of a golf ball. The radius of gyration of a golf ball is generally defined as the way it handles rotative forces when the ball is spinning. In the subject golf ball, the radius of gyration can be easily varied by either increasing or decreasing the density of the outer shell and/or by increasing or decreasing the density of the inner core. For example, if one wanted to create a golf ball wherein the radius of gyration was located near the outer periphery of the ball, the outer shell of the golf ball of this invention can incorporate heavy material which would not effect the play characteristics of the ball in question but which would create mass in the outer shell. For example, the outer shells could incorporate small amounts of heavy metal salts such as a tungsen salt or a lead salt. Like wise, the outer shell could contain powdered metals. To put it in other words, the distribution of the mass along the radius of the ball can be varied by varying the density of either the core material or the outer shell material.

The Core

The specific gravity of the shell as described above is between about 0.75 and about 1.25, preferably about 0.97. Standard golf balls have an average specific gravity of 1.13, a diameter of at least 1.68 inches and a weight of less than 1.62 ounces. In this preferred embodiment, in order to provide a golf ball which has similar physical properties and functional characteristics to standard golf balls, it is preferred to form the core of a material having a specific gravity greater than that of the ball and the shell. In this invention, the core may have a diameter of between about 0.860 inches and about 1.43 inches, preferably 1.30 inches. The core filled with core material may have a specific gravity of between about 0.8 and about 3.9, preferably at about 1.32.

It is understood by one skilled in the art that the specific gravity of the core must be varied depending on the physical dimensions and density of the outer shell and the diameter of the finished golf ball.

It should be appreciated that a wide variety of materials could be utilized including gels, hot-melts and liquid materials. Hot-melts are materials which at or about normal room temperatures are solid but at elevated temperatures become liquid. This property allows its easy injection into the shell to form the core. Examples of suitable gels include water gelatin gels, hydrogels, and water/methyl cellulose gels. Ball embodiments with a gel or other solid core are shown in FIGS. 2 and 4. Examples of suitable melts include waxes and hot melts. Examples of suitable liquids, as shown in FIGS. 1 and 3, include either solutions such as glycol/water, salt in water or oils or coloidal suspensions, such as clay, barytes, carbon black in water or other liquid, or salt in water/glycol mixtures. The preferred material is the liquid solution as described above. An example of a suitable core material is a solution of inorganic salt in a mixture of water and glycol. The inorganic salt is preferably calcium chloride and the glycol is glycerine.

In the thicker (about 0.410 inches down to about 0.160 inches) walled embodiments, the shell material provides most or all of the resilience necessary for the proper performance of the golf ball of the present invention. In the thinner (about 0.060 inches up to about 0.160 inches) walled embodiments, the ball functions and performs in the standard manner, deriving resilience from the core material as well as the shell. The shell may thus vary from about 0.060 to 0.410 inches in thickness, preferably about 0.075 to 0.300 inches or, most preferably about 0.090 to 0.190 inches. It will be understood by one skilled in the art that the properties of the shell material and the thickness of the shell are inter-related. These two variables must be tuned to optimize performance.

The liquid material which is inserted in the shell in accordance with this invention to form the core can be reactive liquid systems which combine to form a solid. Examples of suitable reactive liquids are silicate gels, agar gels, peroxide cured polyester resins, two part epoxy resin systems and peroxide cured liquid polybutadiene rubber compositions. It is understood by one skilled in the art that other reactive liquid systems can likewise be utilized depending on the physical properties of the shell and the physical properties desired in the resulting finished golf balls.

The core of all embodiments, whether liquid or solid, is unitary, of a common material throughout its entire extent, with its exterior surface in contact with the interior surface of its shell. All cores are also essentially homogenous throughout their mass.

Methods of Manufacture

Figure 5:
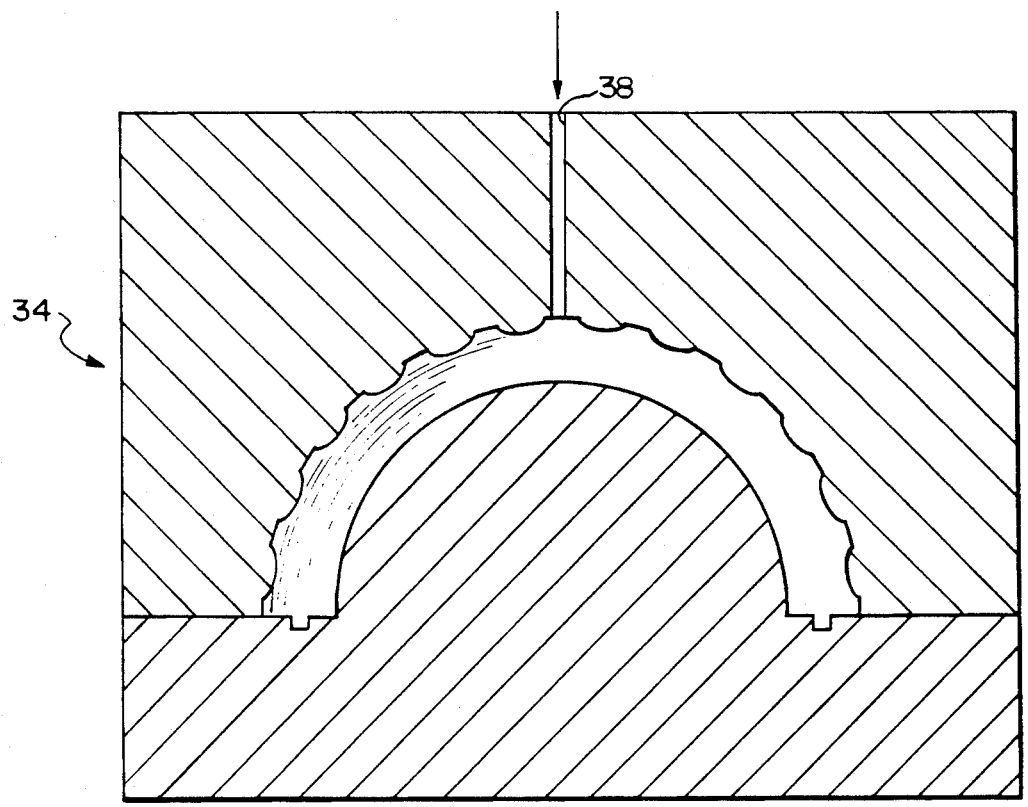
FIGS. 5 and 6 are sectional views of mold halves for forming the two mating halves of a golf ball shell.
Figure 6:
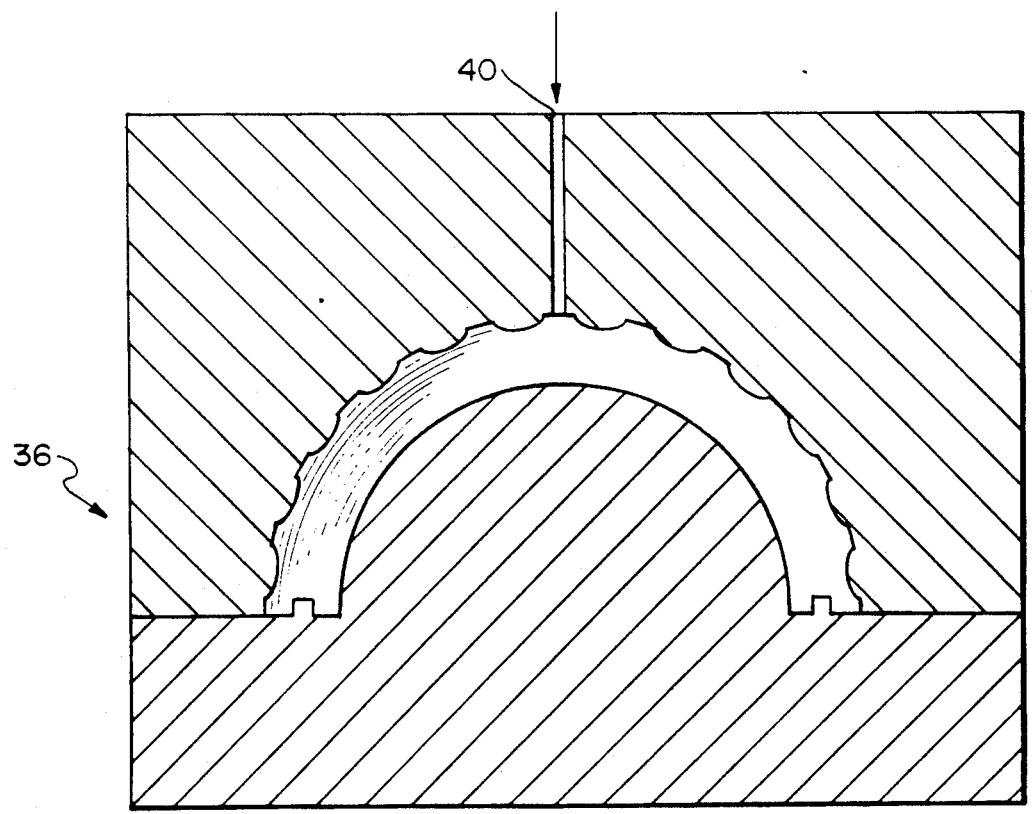

In the preferred method of manufacture of the golf balls as described above, two hemispherically-shaped shell halves 28 and 30 are formed, preferably through injection molding prior to being coupled to form the completed shell. FIGS. 5 and 6 illustrate mold halves 34 and 36 with holes 38 and 40 for the introducing of the material, in fluid form, of which the shell is to be formed. They are identical in shape except at their equator where they are joined. Such halves may be fully identical with flat, planar surfaces 42 and 44 at the equator of the ball at the areas of coupling. Note FIG. 8. It is preferred, however, that male and female tongue 46 and groove 48 surface configurations are provided to assist in the proper placing of the halves with respect to each other. Note FIGS. 1 and 2 as well as FIGS. 5, 6 and 7 as well as 13. 14, and 15. Other configurations at the equator could be utilized, such as a mating undulations 50 and 52 of male and female segments across the shell thickness as shown in FIG. 9. In the embodiment of the thin walled shell of FIGS. 3, 4 and 10, the parting line 54 and 56 may take the form of a cylinder around the periphery of the ball with the parting line in an orientation at an angle to the equator of the ball. This forms a triangular projection in the lower shell half and a mating triangular recess in the upper shell half. Additional surface area is thus provided for bonding purposes. Further, during spin welding, centrifugal forces acting with the shell edges and tooling wall urge together the mating halves for superior coupling.

Figure 11:
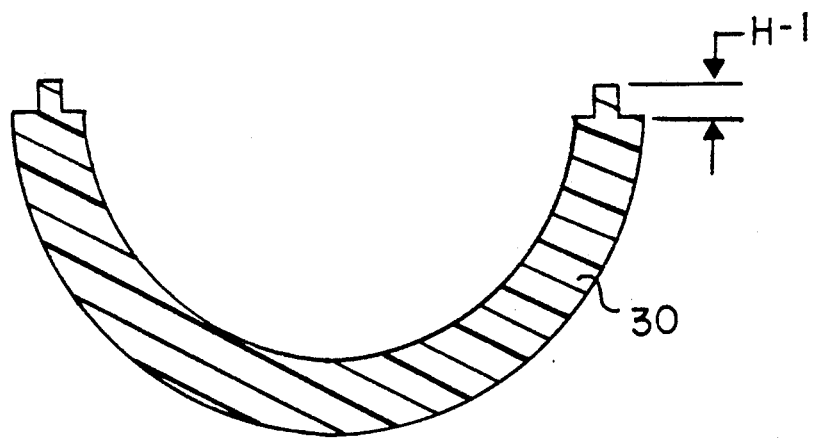
FIGS. 11 and 12 are sectional views of shell halves of a further alternative embodiment prior to being joined.
Figure 12:
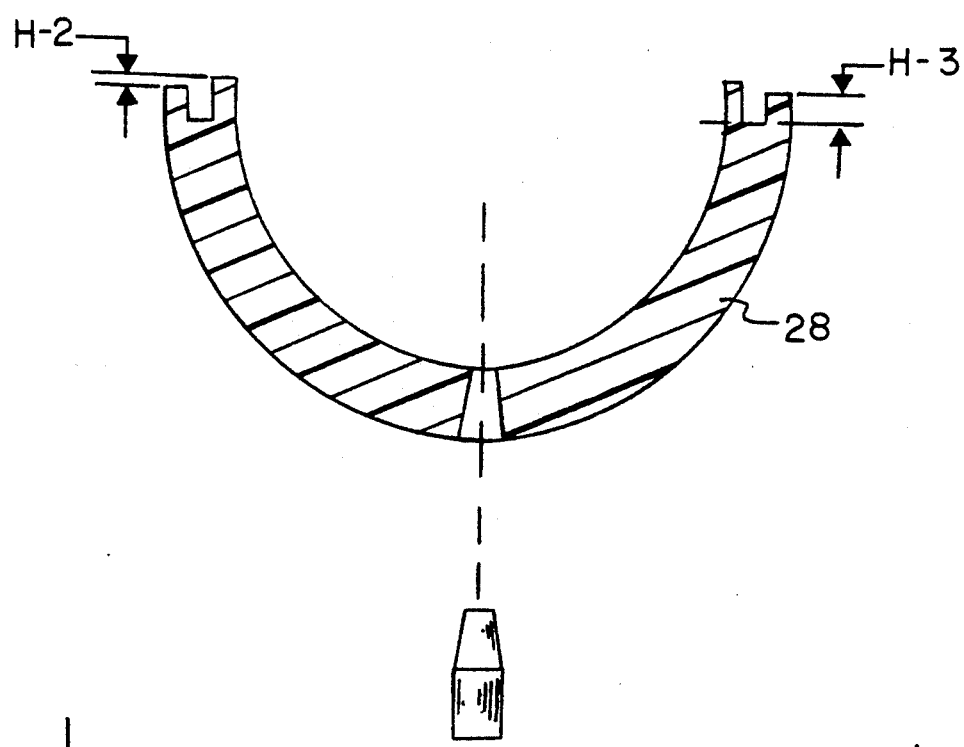
Figure 13:
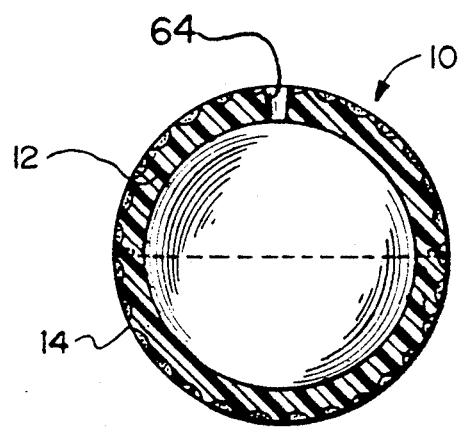
FIGS. 13, 14 and 15 are sectional views of a golf ball shell after the shell halves have been coupled together and sequentially illustrating the injection of core material to fill the shell and constitute its core.
Figure 14:
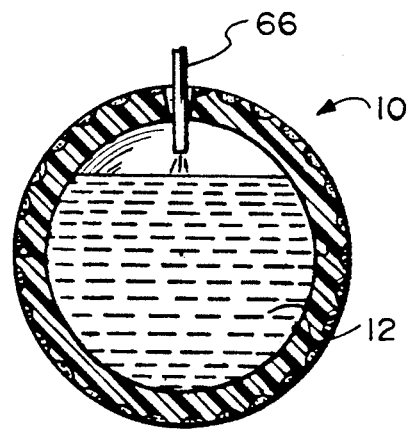

FIGS. 11 and 12 illustrate a preferred tongue and groove arrangement with the tongue of a length H-1 slightly less than the length H-2 of the interior wall of the groove but slightly greater than the length H-3 of the exterior wall of the groove.

Other techniques for forming the shell include conventional blow molding, injection blow molding and rotational casting.

The dimples 16 on the exterior surface of the shell halves are shown as being formed during the injection molding of the halves. It should be appreciated, however, that, in certain embodiments, the ball may be molded with a smooth exterior surface and the dimples molded in after the joining of the halves later during the fabrication process, either before or after the injection of the core and plugging of the hole. The temperature for dimple molding must be sufficiently low as not to be detrimental to the core.

The halves are joined together by any one of a wide variety of manufacturing methods. The preferred method is the spin welding of the halves as effected by fixedly supporting one of the halves 30 in a fixed fixture 60, shown as the lower half in FIG. 7, and supporting the other half 28, shown as the upper half, in a fixture 58 which is rapidly rotated about a vertical axis while moved axially toward the fixed half. Note the arrows of FIG. 7. The frictional energy generated by the movement of one half with respect to the other, while being brought together into mutual contact, will generate sufficient heat to create a final cohesive bond between the melting and coalescing thermoplastic materials of the halves. The resulting structure is then a total, unitary hollow sphere for constituting the shell of the ball. The spin welding is of the conventional type as described, for example, in U.S. Pat. No. 2,956,611 to Jendrisak. A commercially available spin welding machine acceptable for performing this method is Model No. SPW-1-EC manufactured by Olsen Manufacturing Company of Royal Oak, Mich. Other coupling techniques may be readily utilized for joining the halves. Such other techniques include known methods such as ultrasonic welding, vibrational welding, laser welding, solvent welding, compression molding or even adhesive bonding with a suitable adhesive having properties matched to the properties of the shell halves.

Next subsequent in the manufacturing process for the preferred embodiment is the forming of a hole 64 in the shell 14 as through drilling. The hole could also be formed during molding. The hole is preferably tapered radially inwardly toward the center of the sphere to facilitate its subsequent closure. It is understood by one skilled in the art that two or more holes of the same or different sizes may be drilled or molded for the purposes associated with injecting the liquid core material into the outer shell. Thereafter the material of the core 12 is injected through the hole into the center of the shell, as through a hypodermic needle 66 or the like, to totally fill the center of the shell for constituting the core. The plugging of the hole with a conical plug 68 and trimming its cylindrical extension completes the fabrication process unless, of course, the dimples are to be applied following the prior manufacturing steps. The material of the plug is preferably that the same as the remainder of the shell 14. The plug is secured in the hole to seal the shell through any of the above described fabrication techniques, spin welding being presently preferred. In certain embodiments, the core material may be relied upon to seal the hole.

Alternate Embodiments

Figure 16:
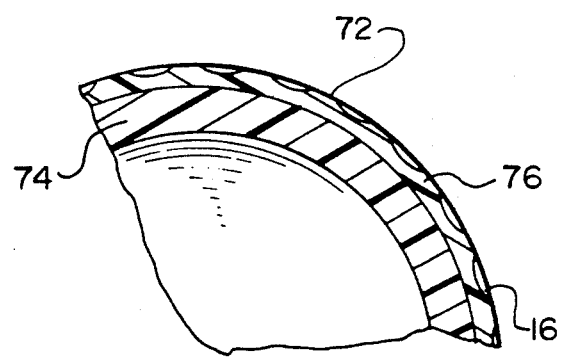
FIGS. 16, 17, 18 and 19 illustrate, in fragmentary sectional view, additional embodiments of shell construction wherein the shells are tailored to yield intended physical characteristics.

In an alternate embodiment of the invention, the shell and core are fabricated by any of the techniques as described above. The shell 72 of FIG. 16, however, is formed of a first or inner layer 74 of a thickness slightly less than the final ball, such shell constituting an internal layer of the final composite shell or laminate formed of plural shell layers. The final exterior shell layer 76 is applied to the exterior surface of the internal shell layer 74, preferably through conventional injection or rotational molding techniques. After the exterior layer 76 of the shell is fabricated, the dimples 16 are then formed in the exterior surface of the ball. The dimples could also be formed during molding through the use of properly configured mold segments.

By fabricating the shell as a multi-layer laminate, its materials can be selected for tailoring the performance of the ball to a particular use or application. For example, the properties such as color, frictional bite, durability, and resistant to scuffs and cuts could be built into the outer layer. The inner layer could simply provide the desired resilience. Further, the interior layer could be of a relatively high modulus of elasticity for increased life and resilience while the external layer could be formed of a lower modulus of elasticity for greater frictional contact with the ball striking surface of the golf club for greater bite and playability. Brightness could be added to the exterior layer only up to maximum loading for minimizing the utilization of such brightening agents.

This embodiment of the shell which is formed of a plurality of bonded layers could be manufactured in a conventional shuttle mode. In this method, the interior molded layer is first injected into the mold to form the interior layer. Thereafter, or visa versa, the exterior layer, of a different material than the interior layer, is injected over the first layer. Such is effected through consecutive shootings into a common mold over a mold component in the fabrication of layered shell halves. This molding technique is common in the molding of typewriter keys wherein the different injected materials form the visible lettering.

Figure 17:
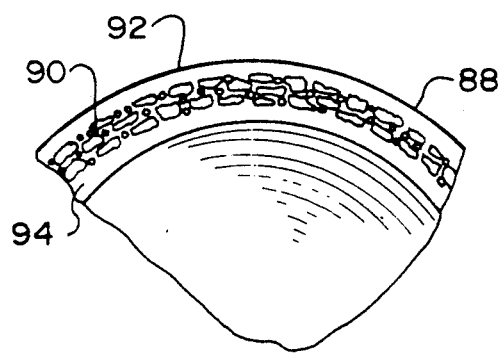
Figure 18:
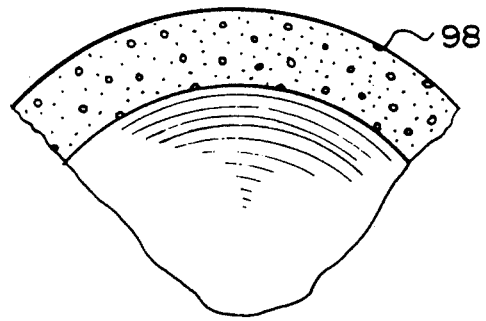
Figure 19:
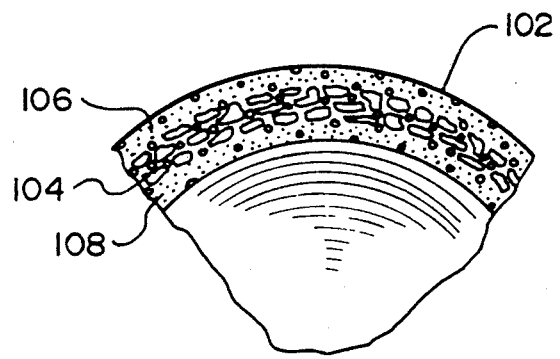

FIGS. 17, 18 and 19 represent three additional embodiments of the subject invention for tailoring the shell properties to a particular application or use. While these three distinct embodiments are illustrated on a particular core, it is understood that the embodiments as illustrated in FIGS. 17, 18, 19 as well as 16, can likewise be used in fabricating a hollow shell or on a hemispherical mold half.

FIG. 17 represents a further embodiment of this invention. In this embodiment the shell 78 incorporates a central cellular stratum 90 which is sandwiched between two non-cellular skins 92 and 94. Non-cellular skins 92 and 94 are formed in situ by varying the process parameters wherein the shell 88 is molded.

Skins 92 and 94 can be altered and formed by a plurality of techniques, for example, the skins can be formed by varying the temperature of the mold during the initial stages of the injection molding process and by varying other parameters, such as melt temperatures, injection time, injection speed, injection pressure, nozzle type, gating, venting, holding pressure, holding time, shot weight, blowing agent concentration, nucleator concentration, polymeric composition, mold surface treatment and mold lubricant. See U.S. Pat. No. 4,274,637 to Molitor for greater details.

FIG. 18 illustrates yet another embodiment of this invention wherein the shell 98 incorporates an essentially uniform cellular structure. In this embodiment the shell 98 is molded over a hemispherical mold half.

FIG. 19 represents still another embodiment of this invention. The shell 102 incorporates a central stratum 104 which is sandwiched between a pair of strata 106 and 108. The central stratum 104 has an apparent density which is less than that of the strata. To put it in other words, the strata have a greater apparent density than that of the central stratum. Naturally, it is obvious to one skilled in the art that in the region of the interfaces between the stratum, the apparent density of the cover will vary. The respective apparent densities of the strata can be varied by one skilled in the art by altering the process parameters as discussed above.

Terms Utilized:

For purposes of this application, when densities and specific gravities are referred to, they are referred to in "apparent densities" and "apparent specific gravities." These terms take into consideration the fact that some of the cover stocks of this invention are non-uniform in that they may incorporate skins and variable cell structures. These terms take into consideration these variables and give the actual density and specific gravity of the average structure.

The terms "apparent densities" and "apparent specific gravities" also apply to the density and specific gravity of the liquid materials injected into the shell to form the core.

The golf ball shell and/or core materials of the subject invention can be used as a means of altering or regulating the coefficient of restitution. The coefficient of restitution of a golf ball is generally indicative of the resiliency of the ball in question, hence indicative of the distance the ball will travel when struck with a golf club. The coefficient of restitution is generally measured by propelling a finished golf ball against a hard surface at a fixed velocity. After the ball has rebounded from the surface its velocity is again measured. The ratio of the rebound velocity over the approach velocity is the coefficient of restitution. The coefficient of restitution is directly related to the resiliency of a golf ball and how far it will travel when struck by a golf club, all other variables being constant.

The resiliency of a golf ball is regulated by the U.S. Golf Association via a test which is generally referred to as the Initial Velocity test. In this test, a golf ball is struck by a rotating mass. The rotating mass is traveling at a speed of approximately 143 feet per second. Once struck by this rotating mass, the velocity of the ball is measured as it passes through two light screens which are positioned forward of the rotating mass. The maximum prescribed limit for a golf ball which is tested in this manner is 255 feet per second at 75 degrees Fahrenheit. This upper limit standard of 255 feet per second corresponds to an average coefficient of restitution of approximately 0.815 measured with an approach velocity of 125 feet per second for a typical Surlyn covered two piece ball.

The coefficient of restitution data as specified below was arrived at by firing balls from a pneumatic cannon at muzzle velocity of 125 feet per second against a steel plate which is positioned ten feet from the muzzle of said cannon and measuring both the initial velocity and return velocity of the rebounding ball. The ratio of said return velocity to the initial velocity is the specified coefficient of restitution.

EXAMPLE 1

Using the procedures described above, the golf balls were prepared as follows:

Formulation 514-92-1 was injection molded into half shells, approximately 1.68 inches in diameter and 0.190 inches thick. Formulation 514-92-1 is as follows:

|  | Parts by Weight |
|---|---|
| Surlyn 1605/8940 | 50 |
| (SURLYN is a Trademark of E.I. DuPont De Nemours & Company of Wilmington, Delaware) | |
| Surlyn 1706/9910 | 50 |
| Unitane O-110 Titanium Dioxide | 2.35 |
| (Unitane O-110 is a Trademark of Kemira, Inc. of Savannah, Georgia) | |
| Uvitex OB | 0.10 |
| (Unitex OB is a Trademark of Ciba-Geigy of Hawthorne, New York) | |
| Ultramarine Blue | 0.024 |
| (Ultramarine Blue is manufactured by Whittaker-Clark and Daniels of South Plainfield, New Jersey) | |
| Total | 102.474 |

The pole height was greater than the equator radius by 0.007 inches to allow for material flow during spin welding of the two half shells to form the hollow sphere. The two shells had a tongue and groove configuration. The two half shells were spin bonded together to produce a hollow sphere at 4100 revolutions per minute (rpm) and 15 second dwell. The grooved half shell had a molded tapered hole 0.125 inches in diameter at the exterior ball surface and 0.0625 inches in diameter at the interior ball surface.

Specific gravity of the cover material can range from 0.95 to 1.25. The preferred range is 0.97 to 1.0.

The flex modulus expressed in psi at 73 degrees Fahrenheit has a range of 30,000 to 60,000. The preferred range is 45M to 60M. Flex modulus are measured in accordance with A.S.T.M. Test D 790.

Samples to date using ionomer compounds as listed below have the following average data:
Specific gravity: 0.97
Actual flex modulus: 50,000
Cover weight: 21 grams
Estimated volume of cover is 0.979 cubic inches, or 13.04 cubic centimeters.

Liquid core material, Formulation A, was introduced using a hypodermic syringe to completely fill the interior void. Formulation A is:

| Formulation A | Parts by Weight |
|---|---|
| Calcium Chloride | 45 |
| Water | 45 |
| Glycerine | 10 |

| Formulation A | Parts by Weight |
| --- | --- |
| Total | 100 |

Figure 15:
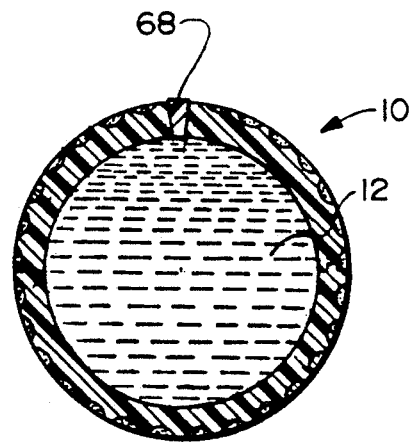

A molded plug in the shape as shown in FIGS. 12 and 15 of the same material as the shell was spin bonded into the hole to seal the contents. Spin bonding conditions were 3150 rpm and 15 seconds dwell.

The resulting product after deflashing had the following average properties:

| | |
| --- | --- |
| Average Diameter: | 1.694 inches |
| Average Weight: | 45.9 grams |
| Average PGA Compression: | 104 |
| Average Coefficient of Restitution: | 0.747 |

These results are the average of the three highest coefficient balls from six (6) balls produced.

The test as described above was repeated. Only 12 balls were manufactured.

| | |
| --- | --- |
| Average Diameter: | 1.685 inches |
| Average Weight: | 45.4 grams |
| Average PGA Compression: | 99 |
| Average Coefficient of Restitution: | 0.725 |

EXAMPLE 2

The procedure of Example 1 was followed, except that the filling material was glycerine.

The resulting product after deflashing had the following properties:

| | |
| --- | --- |
| Average Diameter: | 1.693 inches |
| Average Weight: | 44.4 grams |
| Average PGA Compression: | 107 |
| Average Coefficient of Restitution: | 0.758 |

These results are the average of the three highest coefficient balls of four balls produced.

As is described in Example 1, above, 12 additional balls were manufactured.

| | |
| --- | --- |
| Average Diameter: | 1.686 inches |
| Average Weight: | 43.8 grams |
| Average PGA Compression: | 99 |
| Average Coefficient of Restitution: | 0.732 |

EXAMPLE 3

The procedure of Example 1 was followed, except that the filling material was hydraulic oil, Mobil Etna 26 which is a Trademark of Mobil Oil Corp. of New York City, N.Y.

The resulting product after deflashing had the following properties:

| | |
| --- | --- |
| Average Diameter: | 1.693 inches |
| Average Weight: | 37.5 grams |
| Average PGA Compression: | 108 |
| Average Coefficient of Restitution: | 0.749 |

These results are the average of the three highest coefficient balls of four balls produced.

As is described in Example 1, above, the test of Example 3 were repeated and 12 balls manufactured. The resulting products after deflashing had the following properties:

| | |
| --- | --- |
| Average diameter: | 1.683 inches |
| Average weight: | 37.1 grams |
| Average PGA Compression | 99 |
| Average Coefficient of Restitution: | 0.745 |

EXAMPLE 4

The procedure of Example 1 was followed, except that the filling material was gelatin/sugar/water solution, Formulation B. Formulation B is as follows:

| Formulation B | Parts by Weight |
| --- | --- |
| Gelatin | 45 |
| Royal Gelatin Desert, manufactured by Nabisco Brands, Inc. of East Hanover N.J. 07936 | |
| Sugar | 80 |
| Water | 240 |
| Total | 365 | introduced at one hundred fifty (150) degrees Fahrenheit. On cooling, a solid gel is produced.

The resulting product after deflashing had the following properties:

| | |
| --- | --- |
| Average Diameter: | 1.687 inches |
| Average Weight: | 42.7 grams |
| Average PGA Compression: | 106 |
| Average Coefficient of Restitution: | 0.749 |

These results are the average of the three highest coefficient balls of four balls produced.

As is described above relative to Example 1, the tests were repeated and 12 balls were manufactured. The resulting products after flashing had the following properties:

| | |
| --- | --- |
| Average diameter: | 1.684 inches |
| Average weight: | 42 grams |
| Average PGA Compression | 98 |
| Average Coefficient of Restitution: | 0.733 |

EXAMPLE 5

The procedure of Example 1 was followed, except that the shell material was 514-93-3, as follows:

| | Parts by Weight |
| --- | --- |
| Escor 900 | 50 |
| (Escor is a Trademark of Exxon Chemical of Houston, Texas) | |
| Escor 4000 | 50 |
| Uritane 0-110 Titanium Dioxide | 2.35 |
| Uvitex OB | 0.10 |
| Ultramarine Blue | 0.024 |
| Total | 102.474 |

The resulting product after deflashing had the following properties:

| Average Diameter: | 1.693 inches |
|---|---|
| Average Weight: | 45.9 grams |
| Average PGA Compression: | 104 |
| Average Coefficient of Restitution: | 0.747 |

These results are the average of the three highest coefficient balls of four balls produced.

As is described above in Example 1, the tests of Example 1 were repeated and 12 golf balls formed: The resulting products after deflashing had the following physical properties.

| Average diameter: | 1.687 inches |
|---|---|
| Average weight: | 45.4 grams |
| Average PGA Compression | 104 |
| Average Coefficient of Restitution: | 0.738 |

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described, What is claimed is:

1. A method of making a golf ball comprising the steps of:
    (1) Forming a hollow shell in the configuration of a sphere from a deformable polymeric material; and
    (2) Introducing into said shell a liquid material which forms a homogeneous core filling said shell, the structural characteristics of said shell and core being such that said golf ball has a high coefficient of restitution and conforms to the initial velocity requirements of the U.S.G.A., and said golf ball may be driven long distances in regulation play.

2. The method of claim 1 wherein the shell is formed of two essentially hemispherically shaped molded halves and further including the step of coupling together the halves from a process selected from a member of the group consisting of spin welding, sonic welding, solvent welding, compression molding and adhesive bonding.

3. The method of claim 2 wherein the introduction of the liquid into the shell is effected through a pre-drilled hole or holes, and plugging said hole or holes after the introduction of the liquid into the shell.

4. The method according to claim 1, 2 or 3 wherein said coefficient of restitution is at least 0.700.

5. A golf ball made by the method of claim 1, 2 or 3.

* * * * *